United States Patent
Yoshikawa (10) Patent No.: US 9,952,381 B2
(45) Date of Patent: Apr. 24, 2018

(54) LIGHT SOURCE DEVICE AND DISPLAY APPARATUS

(71) Applicant: Sakai Display Products Corporation, Sakai-shi, Osaka (JP)

(72) Inventor: Takahiro Yoshikawa, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 15/107,367

(22) PCT Filed: Jan. 6, 2014

(86) PCT No.: PCT/JP2014/050031
§ 371 (c)(1),
(2) Date: Jun. 22, 2016

(87) PCT Pub. No.: WO2015/102052
PCT Pub. Date: Jul. 9, 2015

(65) Prior Publication Data
US 2017/0003443 A1 Jan. 5, 2017

(51) Int. Cl.
*F21V 8/00* (2006.01)
*G02F 1/1333* (2006.01)

(52) U.S. Cl.
CPC ......... *G02B 6/0093* (2013.01); *G02B 6/0088* (2013.01); *G02F 1/133308* (2013.01);
(Continued)

(58) Field of Classification Search
CPC .. G02B 6/0091; G02B 6/0088; G02B 6/0093; G02B 6/0021; G02B 6/0083; G02B 6/0068; G02F 1/133615; G02F 2001/133322; G02F 2201/46; G02F 2201/503; G02F 1/13308; G02F 2001/13317; G02F 2001/13332; G02F 2201/54; F21Y 2103/10; F21K 9/61
See application file for complete search history.

(56) References Cited

U.S. PATENT DOCUMENTS 8,777,439 B2 * 7/2014 Kuromizu ............ G02B 6/0088
362/633
8,840,293 B2 * 9/2014 Cho ..................... G02B 6/0068
362/606
(Continued)

FOREIGN PATENT DOCUMENTS

JP 2002-196693 A 7/2002
JP 2008-027736 A 2/2008
(Continued)

*Primary Examiner* — Hargobind S Sawhney
(74) *Attorney, Agent, or Firm* — Rudy J. Ng; Bret E. Field; Bozicevic, Field & Francis LLP (57) ABSTRACT

A light source device according to the present invention includes a light guide plate, a light source opposed to one end face of the light guide plate, a casing with one face being open, which houses the light guide plate and the light source and a frame member fitted onto an edge of the casing, the casing includes a contact part directly or indirectly being in contact with the one end face of the light guide plate at a side of the light source, and the frame member includes an elastic contact part being in contact with the other end face of the light guide plate while being elastic, at a side opposite to the light source.

8 Claims, 12 Drawing Sheets

(52) U.S. Cl.
CPC ............ *G02F 2001/133317* (2013.01); *G02F 2001/133322* (2013.01); *G02F 2201/46* (2013.01); *G02F 2201/503* (2013.01); *G02F 2201/54* (2013.01)

(56) References Cited

U.S. PATENT DOCUMENTS

| | | | | |
|---|---|---|---|---|
| 8,870,437 | B2* | 10/2014 | Yoshikawa | G02F 1/133608 349/58 |
| 2011/0110115 | A1 | 5/2011 | Hashimoto | |
| 2012/0250354 | A1* | 10/2012 | Yoshida | G02B 6/0085 362/613 |
| 2012/0281151 | A1* | 11/2012 | Abe | G02B 6/0091 348/739 |
| 2012/0287371 | A1* | 11/2012 | Oura | G02F 1/133615 349/60 |
| 2012/0293727 | A1* | 11/2012 | Yoshikawa | G02F 1/133608 348/739 |

FOREIGN PATENT DOCUMENTS

| | | | |
|---|---|---|---|
| JP | 2009158233 A * | 7/2009 | |
| JP | 2011-108366 A | 6/2011 | |
| JP | 2012-208254 A | 10/2012 | |
| JP | 2012-237826 A | 12/2012 | |
| WO | WO2012036061 A1 | 3/2012 | |
| WO | WO2012111549 A1 | 8/2012 | |

\* cited by examiner

LIGHT SOURCE DEVICE AND DISPLAY APPARATUS

CROSS-REFERENCE TO RELATED APPLICATIONS

This application is the national phase under 35 U.S.C. § 371 of PCT International Application No. PCT/JP2014/050031 which has an International filing date of Jan. 6, 2014 and designated the United States of America.

FIELD

The present invention relates to a light source device used as, for example, a backlight irradiating a liquid crystal panel (display panel) with light, and to a display apparatus comprising the light source device.

BACKGROUND

A display apparatus comprising a liquid crystal panel as an image display unit is configured to include a backlight device (light source device) at the back side of the liquid crystal panel, and to modulate the light emitted from the light source device at the liquid crystal panel which passes the light therethrough, to display an image on the front face of the liquid crystal panel.

Backlight devices are roughly divided into a direct type and an edge light type, of which back light devices of the edge light type have been widely employed recently in terms of lower power consumption and thinning of the devices.

A backlight device of the edge light type includes a light guide plate and a light source housed inside a backlight chassis having the shape of a shallow box with one face being open.

The light guide plate is a translucent plate made of resin, which is placed on the bottom plate of the backlight chassis.

The light source is fixed to the inner wall of the backlight chassis, and is opposed to one end face of the light guide plate.

A peripheral part of the light guide plate as well as the arrangement position of the light source are covered over an appropriate width by a frame fitted onto the edge of the backlight chassis through the open side.

The light emitted from the light source enters the light guide plate, then progresses while spreading inside the light guide plate, and is distributed across the entire surface of the light guide plate which is exposed to the inner side of the frame, to be output therefrom.

In order to increase the luminance of the light emitted from the light guide plate in this type of backlight device, it is important to assemble the device while maintaining the distance between the light guide plate and the light source that face each other as small as possible so that the light emitted from the light source may effectively enter the opposing end face of the light guide plate.

Meanwhile, the light guide plate may possibly be expanded by the heat generated at the light source, which causes a problem of damaging the light source by the expanded light guide plate touching the light source if the distance between the light source and the light guide plate facing each other is small.

The backlight device disclosed in WO2012/111549 is configured to have a restriction member arranged between a rectangular light guide plate and a light source opposed to one long side of the light guide plate, while a protrusion formed at both short sides of the light guide plate are engaged with a recess formed at the corresponding portions of the backlight chassis, and a leaf spring for applying a bias force toward the light source is interposed at the engaged part.

In the backlight device according to WO2012/111549, the light guide plate is positioned while being pressed against the restriction member by the bias force of the leaf spring, so that the distance between the light source and the light guide plate is maintained to be constant by the restriction member and the thermal expansion of the light guide plate is allowed because of the deflection of the leaf spring, which can increase the luminance and prevent damage to the light source.

The backlight device described in WO2012/111549, however, uses the leaf spring for positioning the light guide plate, which has a problem of the increased number of parts and a cumbersome work of interposing the leaf spring at the position where a recess and a protrusion are engaged.

Moreover, the backlight device in WO2012/111549 requires a wide frame for covering the peripheral edge of the light guide plate because the side wall of the backlight chassis provided with the recess is thick. This has caused a problem of difficulties in responding to the demand for a slim border in a display apparatus.

The present invention has been made in view of the circumstances described above, and aims to provide a light source device and a display apparatus capable of reducing the number of parts and of emitting light with high luminance while responding to the demand for a slim border.

SUMMARY

A light source device according to one embodiment of the present invention includes a light guide plate, a light source opposed to one end face of the light guide plate, a casing with one face being open, which houses the light guide plate and the light source and a frame member fitted onto an edge of the casing, the casing includes a contact part directly or indirectly being in contact with the one end face of the light guide plate at a side of the light source, and the frame member includes an elastic contact part being in contact with the other end face of the light guide plate while being elastic, at a side opposite to the light source.

A display apparatus according to one embodiment of the present invention includes the light source device, and a display panel opposed to the light guide plate of the light source device, a back face of the display panel is irradiated with light emitted from the light guide plate, so that an image is displayed on a front face of the display panel.

According to the present invention, a light source device may reduce the number of parts and may emit light with high luminance while responding to the demand for a slim border.

MODES OF CARRYING OUT THE INVENTION

Embodiment 1

The present invention will be described below in detail with reference to the drawings illustrating the embodiments thereof.

In the description below, upper, lower, left and right in the drawings are used.

Figure 1:
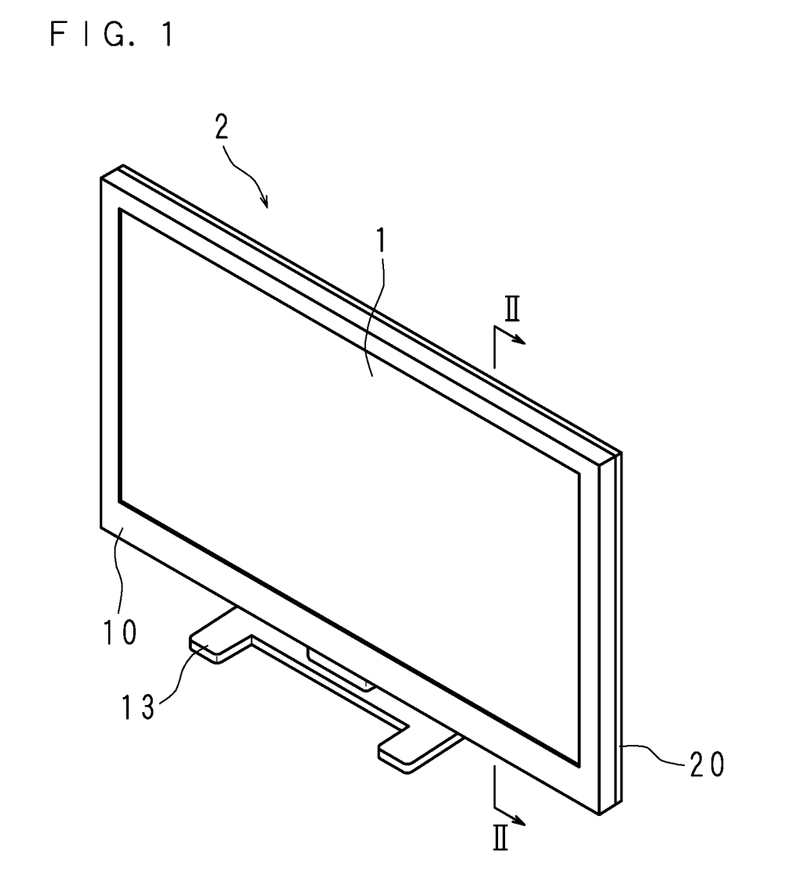
FIG. 1 is a perspective view schematically illustrating the outer appearance of a display apparatus according to Embodiment 1.

FIG. 1 is a perspective view schematically illustrating the outer appearance of a display apparatus according to Embodiment 1.

Figure 2:
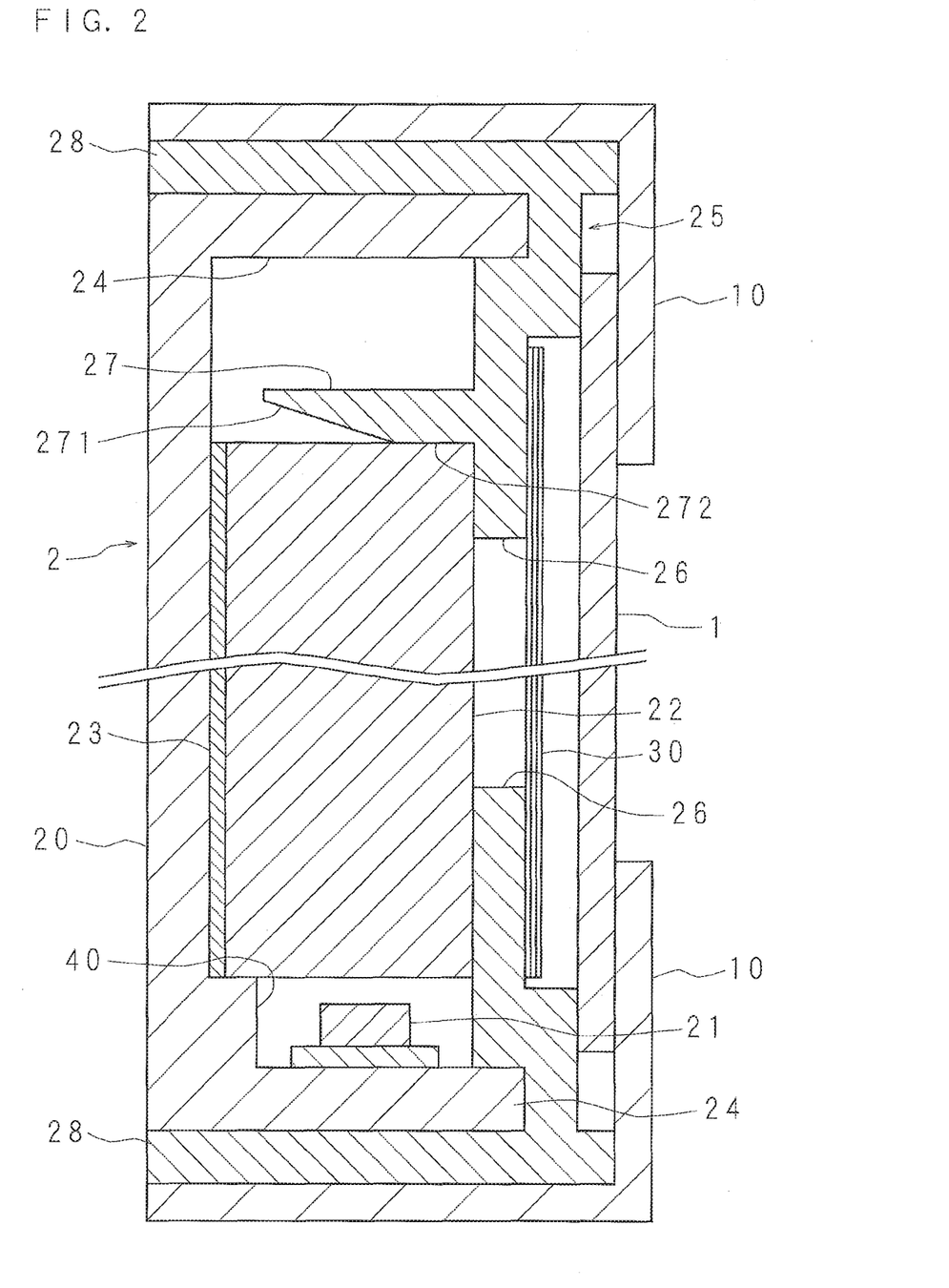
FIG. 2 is a vertical cross-section view along the line II-II in FIG. 1.

FIG. 2 is a vertical cross-section view along the line II-II in FIG. 1. The illustrated display apparatus includes a liquid crystal panel (display panel) 1 for image display formed in the shape of a rectangular plate, and a backlight (light source device) 2 irradiating the liquid crystal panel 1 with light.

A front cabinet 10 having the shape of a rectangular frame is mounted to the liquid crystal panel 1, to frame the peripheral edge on the front face (image display surface) thereof over an appropriate width. FIG. 1 only illustrates the image display surface of the liquid crystal panel 1 exposed in the frame of the front cabinet 10. The back side of the liquid crystal panel 1 is covered by a backlight chassis (casing) 20 constituting the outer casing of the backlight 2. The backlight chassis 20 is a box with the same shape as that of the front cabinet 10.

The display apparatus further comprises a stand 13. The stand 13 is formed of a columnar leg protruding vertically from a middle part of one long side of the backlight chassis 20, and a foot having the shape of the letter H which is formed continuously with the leg expands so as to be substantially vertical to the leg. The display apparatus is supported on a placement surface via the stand 13, and is used while keeping the image display surface of the liquid crystal panel 1 in the vertical posture.

As illustrated in FIG. 2, the backlight 2 comprises a backlight chassis 20 and a light source 21 housed in the backlight chassis 20. The backlight chassis 20 is formed in the shape of a shallow box with one face being open. A light guide plate 22 is mounted at the bottom face of the backlight chassis 20. The light guide plate 22 is a translucent plate made of resin, which has a rectangular shape slightly smaller than the backlight chassis 20. A reflection sheet 23 is adhered to the entire surface of the light guide plate 22 at the side of the backlight chassis 20. The light source 21 includes an elongated rectangular substrate, and multiple light emitting diodes (LED, only one of which is illustrated) arranged side by side on the substrate along the longitudinal direction. The light source 21 is mounted such that the surface thereof where the LEDs are arranged is opposed to one end face of the light guide plate 22. At the bottom face of the backlight chassis 20, a contact part 40 is formed, which is located at the side of the light source 21. The contact part 40 is, for example, a boss formed on the backlight chassis 20. The backlight 2 is configured such that a holding frame (frame member) 25 is fitted onto the backlight chassis 20.

The holding frame 25 is a rectangular frame-like member made of resin having a modulus of elasticity smaller than that of the light guide plate 22, and includes an edge part 28 fitted onto the outer periphery of the backlight chassis 20 and a projection part 26 which projects to the inner side from the edge 28. The holding frame 25 also includes an elastic contact part 27 extending from the projection part 26 to be in parallel with the other end face of the light guide plate 22 toward the backlight chassis 20. The projection part 26 makes contact with the edge of the light guide plate 22 to hold the light guide plate 22 between itself and the bottom plate of the backlight chassis 20.

The elastic contact part 27 faces the bottom face of the backlight chassis 20, and is formed as a plate-like rib which can be deflected in the thickness direction. The tip end of the elastic contact part 27 has an inclined surface 271 at side of the other end face of the light guide plate 22, whereas the base thereof has a contact face 272 which is vertical to one surface of the projection part 26. The inclined surface 271 is so inclined as to reduce the thickness of the elastic contact part 27 toward the tip end. The light guide plate 22 is held between the elastic contact part 27 and the contact part 40.

Figure 3:
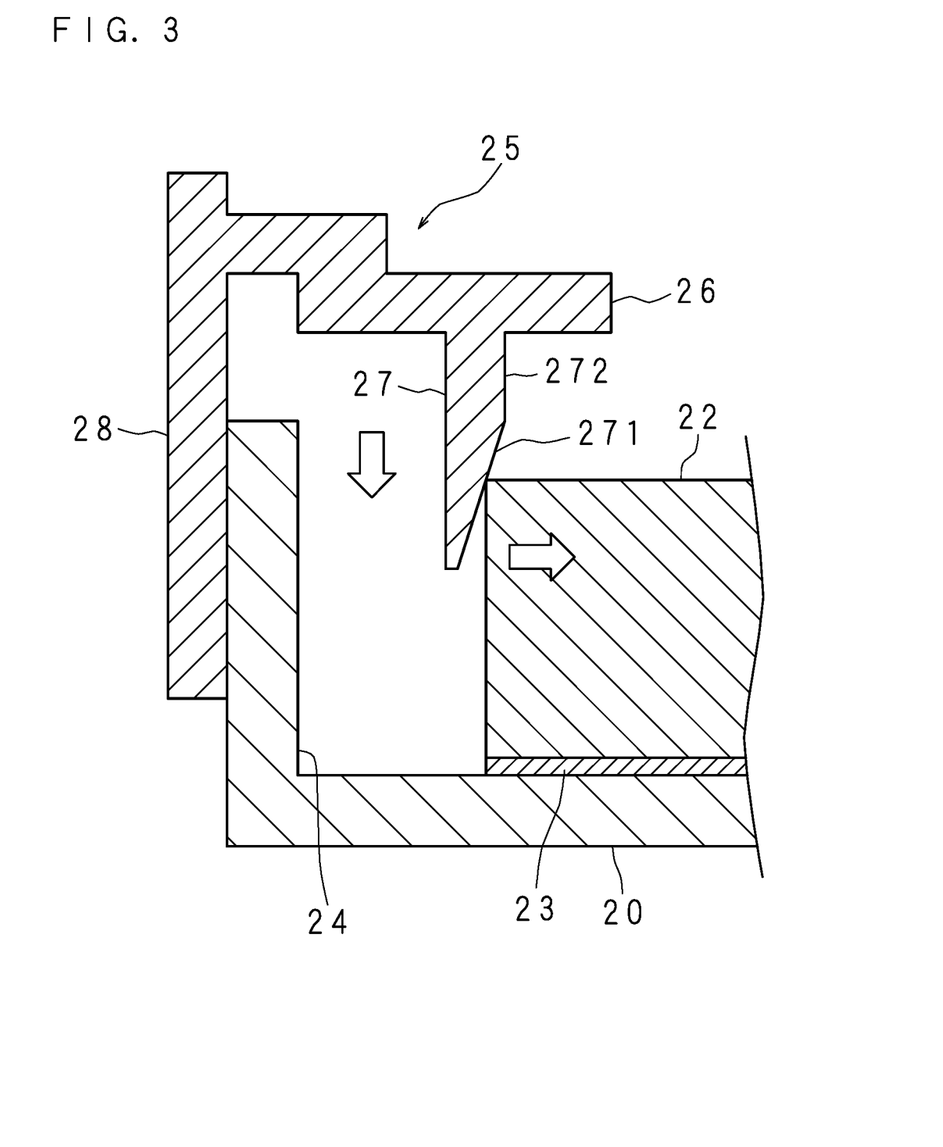
FIG. 3 illustrates a procedure for attaching a holding frame.
Figure 4:
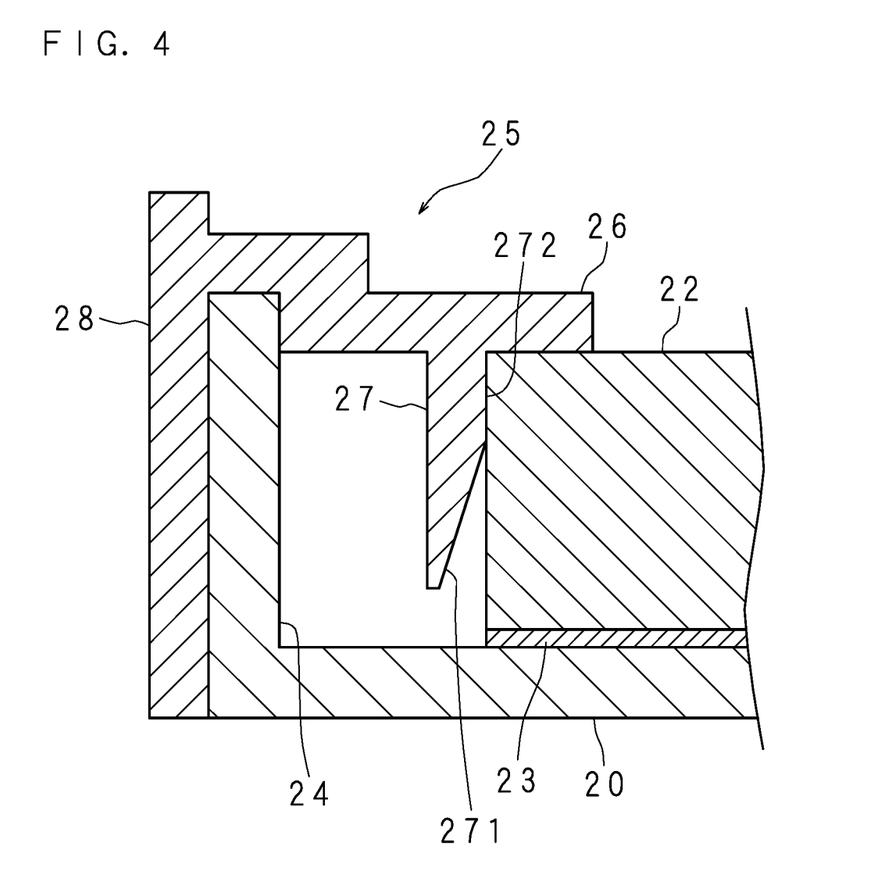
FIG. 4 illustrates a procedure for attaching a holding frame.

FIGS. 3 and 4 illustrate the procedure for attaching the holding frame 25. The procedure for attaching the holding frame 25 to the backlight chassis 20 is as follows. As indicated by the down arrow, the edge part 28 of the holding frame 25 is fitted onto the peripheral part 24. Here, the elastic contact part 27 moves the light guide plate 22 as indicated by the right arrow to the side of the light source 21 while the inclined surface 271 thereof is in contact with the other end face of the light guide plate 22. The end face at the light source 21 side of the moved light guide plate 22 makes contact with the contact part 40, so as to position the light guide plate 22 in the plane direction by holding the light guide plate 22 between the contact part 40 and the elastic contact part 27, and to position the light guide plate 22 in the vertical direction by holding the light guide plate 22 between the projection part 26 and the bottom plate of the backlight chassis 20, as described earlier.

The backlight 2 configured as described above directs light emitted by the light source 21 through a side edge of the light guide plate 22. The light entering the light guide plate 22 is totally reflected at the adhering surface of the reflection sheet 23, partially reflected at a surface opposite to the adhering surface, and progresses in the light guide plate 22 while spreading. The light guide plate 22 outputs the light reflected at the adhering surface of the reflection sheet 23 through an opening of the backlight chassis 20.

The optical sheet 30 is placed on the holding frame 25 of the backlight 2 configured as described above, and the front cabinet 10 is mounted to the outer side of the backlight 2, to constitute a display apparatus.

Figure 5:
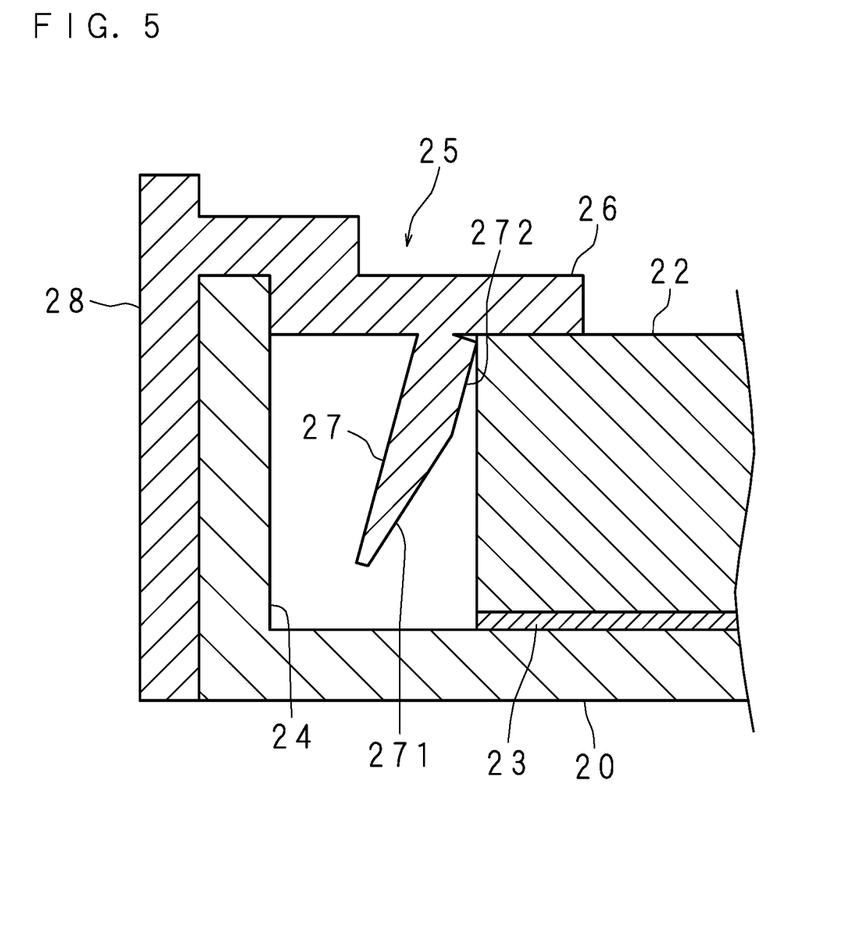
FIG. 5 illustrates a backlight in the state where a light guide plate is thermally expanded.

The light guide plate 22 is expanded by the heat generated along with the light emitted from the light source 21. FIG. 5 illustrates the backlight 2 in the state where the light guide plate 22 is thermally expanded. As illustrated in FIG. 5, in the case where the light guide plate 22 is expanded by the heat generated from the light source 21, the light guide plate 22 does not move toward the light source 21 because of the presence of the contact part 40 but moves toward the elastic contact part 27 while pressing the elastic contact part 27 to the peripheral part 24 side. The pressed elastic contact part 27 is deflected to the peripheral part 24 side. Since the contact part 40 is present at the light source 21 side, the distance between the light source 21 and the light guide plate 22 will not be shortened, preventing the light guide plate 22 from hitting the light source 21.

The display apparatus according to the present embodiment may perform positioning by the contact part 40 and the elastic contact part 27, which can therefore reduce the number of parts and also respond to the demand for a slim border. Furthermore, the light guide plate 22 may be located near the light source 21 because of the elastic contact part 27, which allows the light emitted from the light source 21 to enter the light guide plate 22 without a waste, making it possible for the backlight 2 to emit light with high luminance.

The inclined surface 271 makes contact with the end face of the light guide plate 22 when the frame is fitted onto the backlight chassis 20 to move the light guide plate 22 to the light source 21 side, so that the light guide plate 22 can accurately be positioned.

Because of its flexibility, the elastic contact part 27 is deflected if the light guide plate 22 is expanded due to the heat generated by the light emitted from the light source 21, so as to accommodate the movement of the light guide plate 22 in the direction of the light source 21.

Figure 6A:
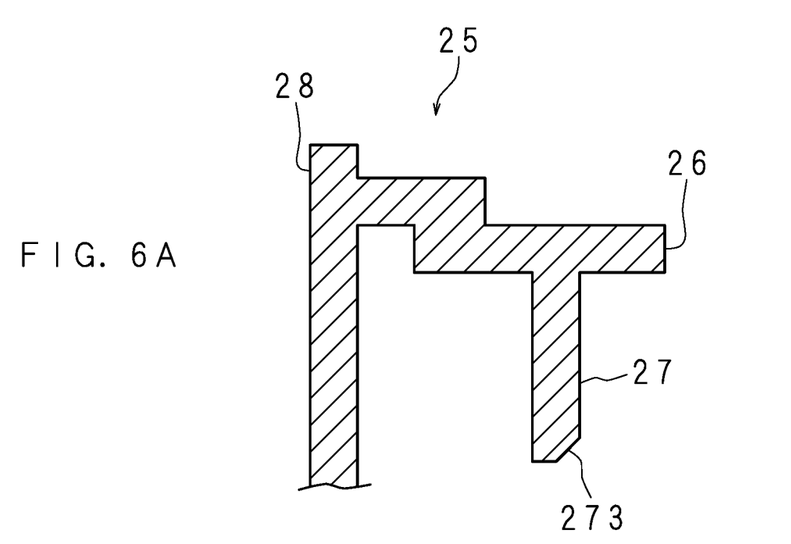
FIGS. 6A to 6C are enlarged section views illustrating an example of other shapes of an elastic contact part.
Figure 6B:
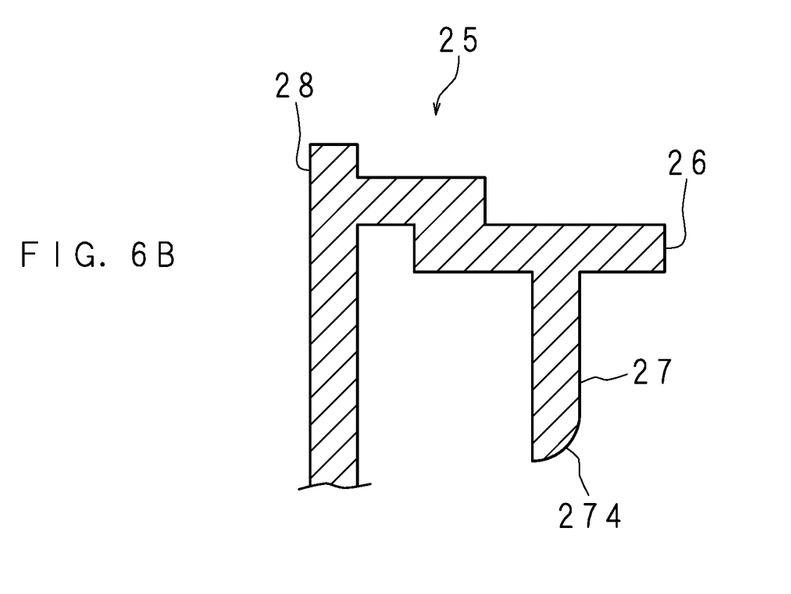
Figure 6C:
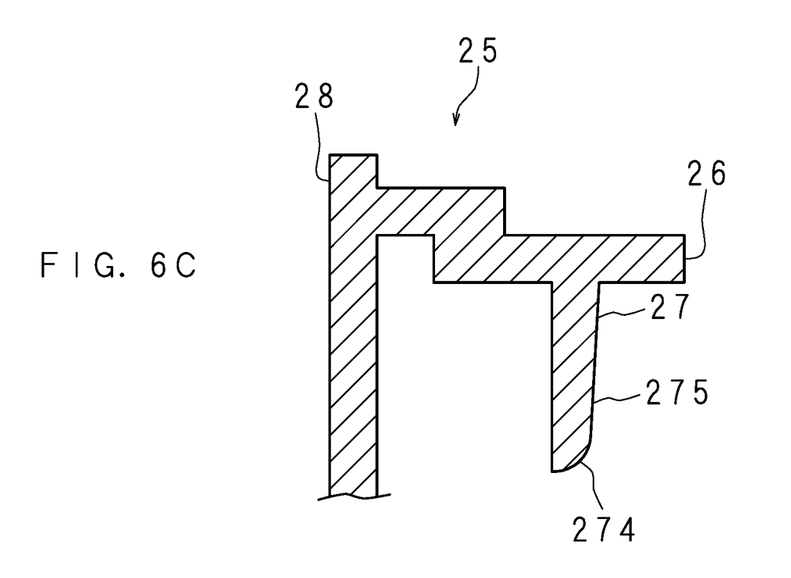

The shape of the elastic contact part 27 is not limited to the form described earlier. FIGS. 6A to 6C are enlarged section views illustrating examples of other shapes of the elastic contact part 27. As illustrated in FIG. 6A, the elastic contact part 27 has the same thickness over its entire length, and the tip end of the elastic contact part 27 is provided with a chamfered part 273 at the crest of the side being in contact with the other end face of the light guide plate 22.

As illustrated in FIG. 6B, the elastic contact part 27 has the same thickness over its entire length, and the tip end of the elastic contact part 27 is provided with an arc-like chamfered part 274 at the crest of the side being in contact with the other end face of the light guide plate 22.

As illustrated in FIG. 6C, the elastic contact part 27 has an inclined surface 275 which is inclined toward the other end face of the light guide plate 22 such that the thickness thereof is reduced toward the tip end, and the tip end of the elastic contact part 27 is provided with an arc-like chamfered part 274 at the crest of the side being in contact with the other end face of the light guide plate 22.

The chamfered parts 273 and 274 serve to touch and guide the end face of the light guide plate 22 as with the inclined surface 271, alleviating the impact generated by the end face of the light guide plate 22 touching the elastic contact part 27 when the frame 25 is fitted onto the backlight chassis 20.

While the contact part 40 is directly in contact with the light guide plate 22 in the present embodiment, it may also be in contact with the light guide plate 22 while another member is interposed in between.

Figure 7:
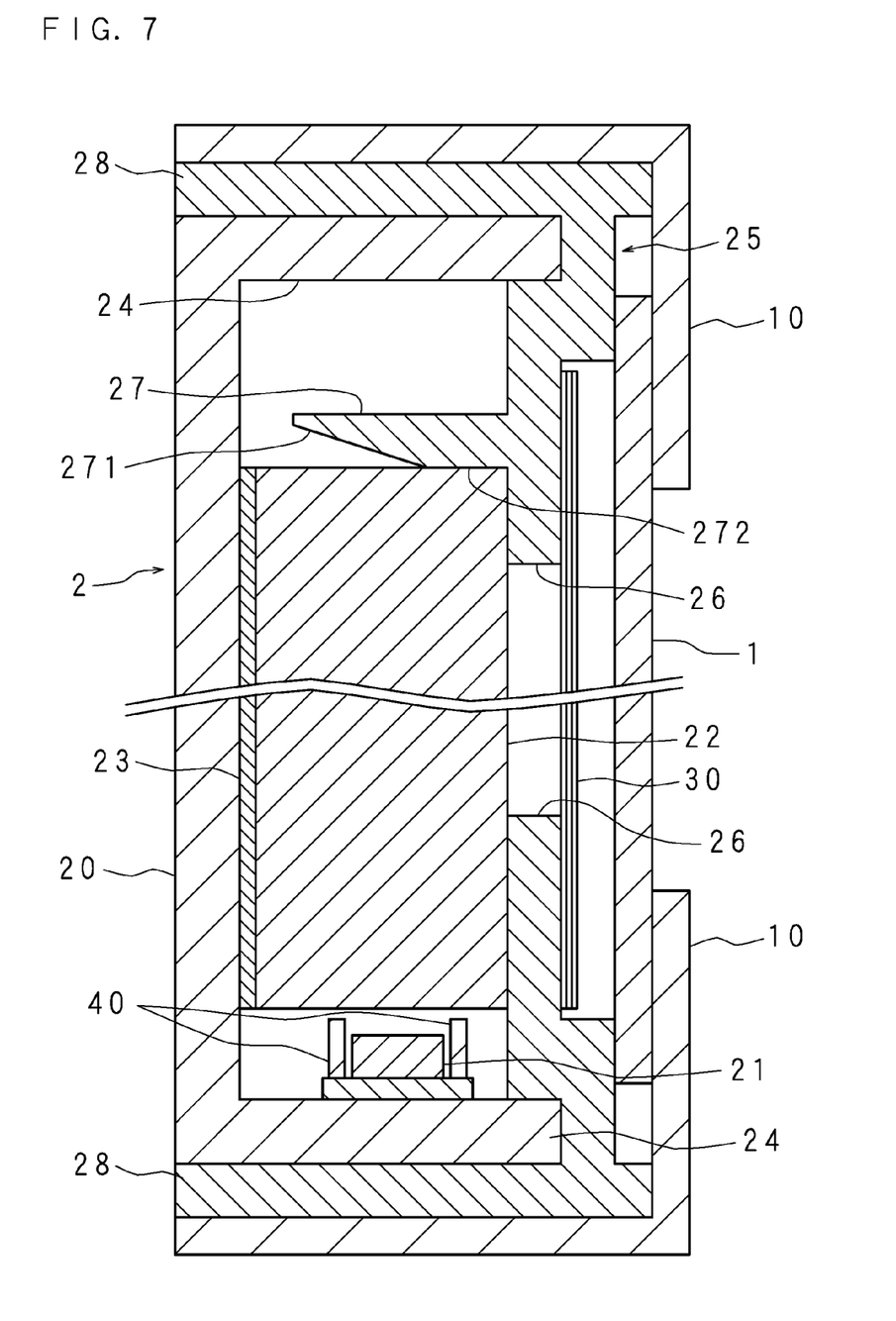
FIG. 7 is an enlarged section view illustrating another position of a contact part.

The position of the contact part 40 is not limited to the form described earlier. FIG. 7 is an enlarged section view illustrating other positions of the contact parts 40. The contact parts 40 are arranged on the substrate of the light source 21 to be in parallel with each other in the longitudinal direction of the substrate. The contact part 40 is, for example, a screw formed on the backlight chassis 20.

Embodiment 2

Figure 8:
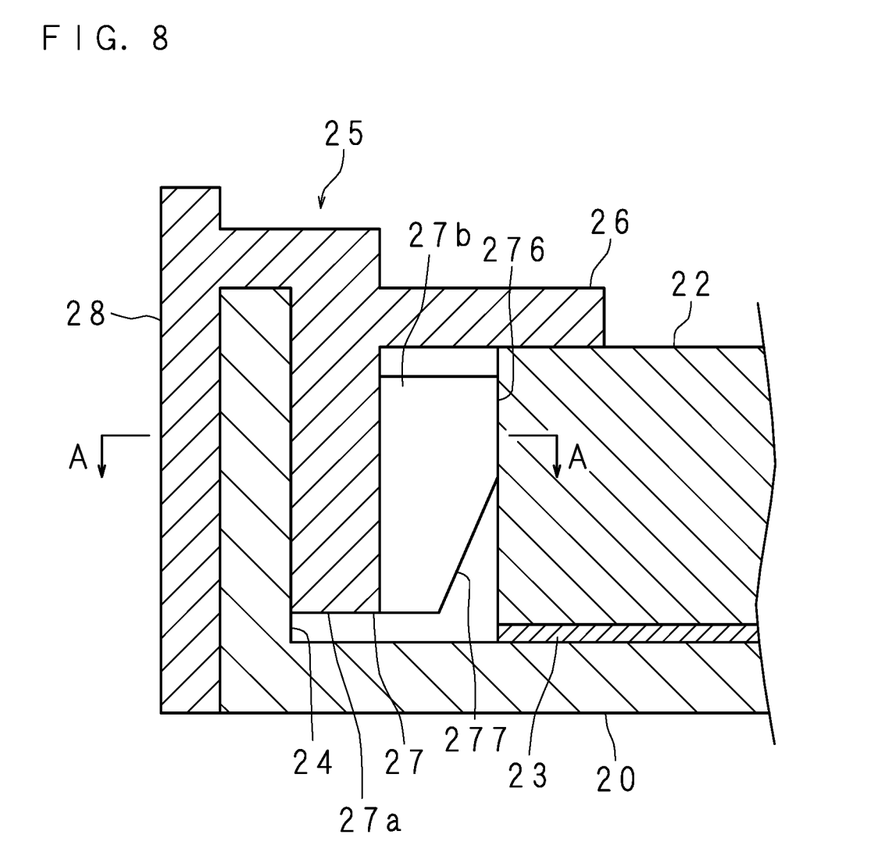
FIG. 8 is a vertical section view of a backlight.
Figure 9A:
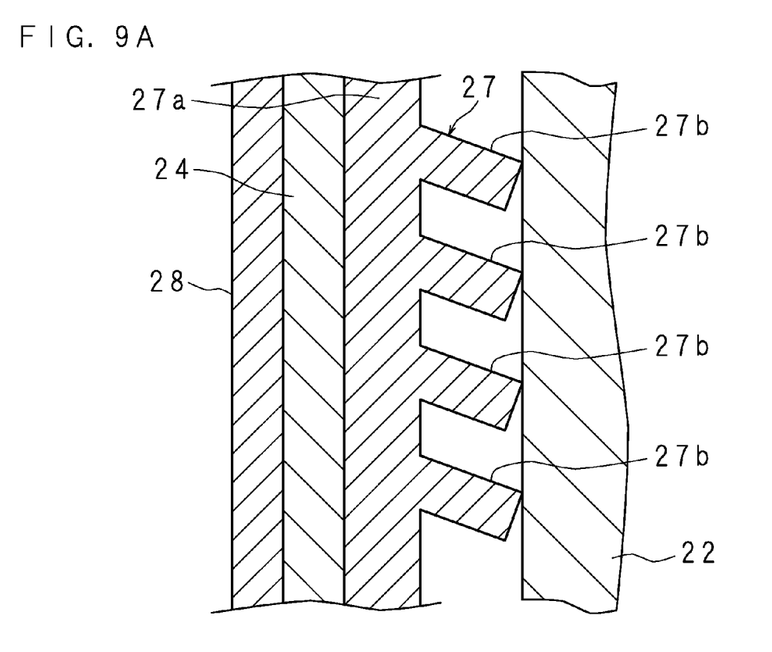
FIGS. 9A and 9B are enlarged section views along the line A-A in FIG. 8.
Figure 9B:
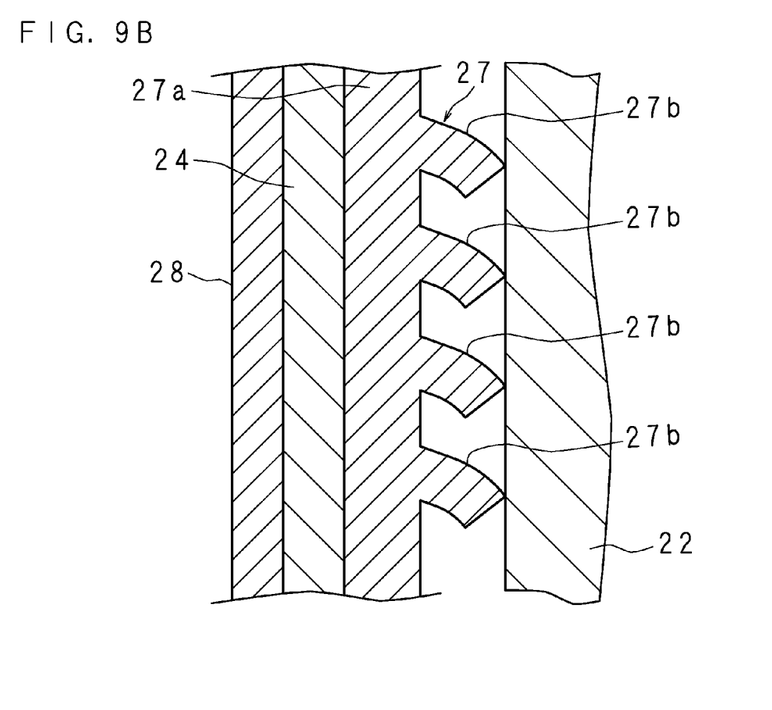

FIG. 8 is a vertical section view of the backlight 2. FIGS. 9A and 9B are enlarged section views along the line A-A in FIG. 8. The configuration and function are the same as those in Embodiment 1, except for the configuration and function specifically described below, and therefore will not be described in detail for the sake of simplifying the description.

The elastic contact part 27 includes a support board 27a formed at the projection part 26, and an elastic protrusion 27b provided on the support board 27a. The support board 27a is so provided as to extend from the projection part 26 to be in parallel with the other end face of the light guide plate 22 toward the backlight chassis 20. As illustrated in FIG. 9A, multiple elastic protrusions 27b are arranged to be in parallel with one another on one end face at the light source 21 along the longitudinal direction. Each of the elastic protrusions 27b is a board with vertical cross section of a trapezoid. The elastic protrusions 27b are formed on a surface on the opposite side of the side where the support board 27a is formed, and has a contact surface 276 which is in contact with the light guide plate 22 and an inclined surface 277 which is continuously formed from the contact surface 276 at the side of the other end face of the light guide plate 22. The inclined surface 277 is so inclined as to reduce the thickness of the elastic protrusion 27b toward the tip end.

In the case where the light guide plate 22 is expanded by the heat generated along with the light emitted by the light source 21, as illustrated in FIG. 9B, the light guide plate 22 is expanded to the side of the elastic contact part 27 and presses the elastic protrusion 27b to the side of a circumferential part 24. The pressed elastic protrusion 27b is deflected to the peripheral part 24 side.

If the light guide plate 22 is expanded due to the heat generated by the light emitted from the light source 21, the elastic protrusions 27b may deflect and thereby accommodate the movement of the light guide plate 22 in the direction of the light source 21.

Figure 10A:
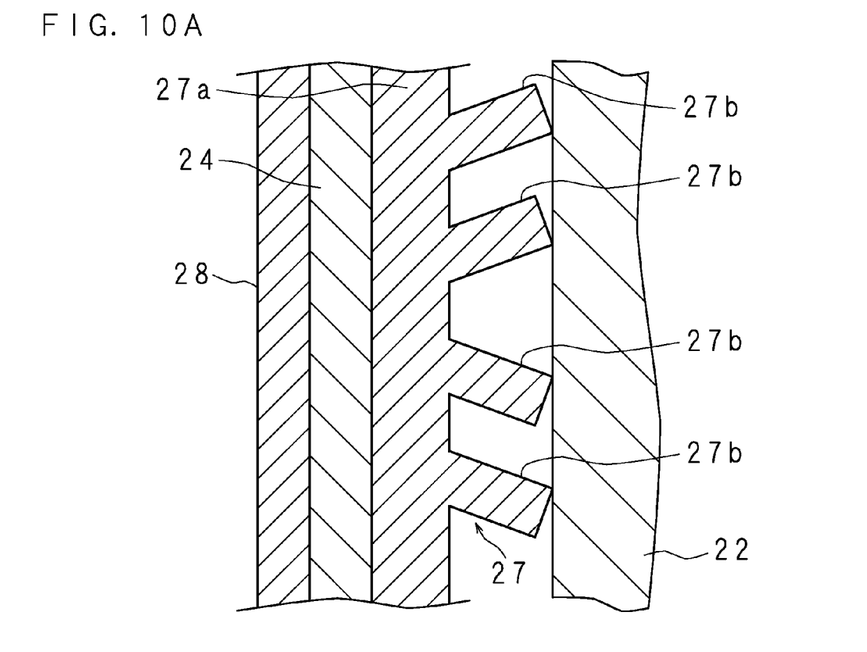
FIGS. 10A and 10B are enlarged sections view illustrating examples of other arrangements of the elastic contact part.
Figure 10B:
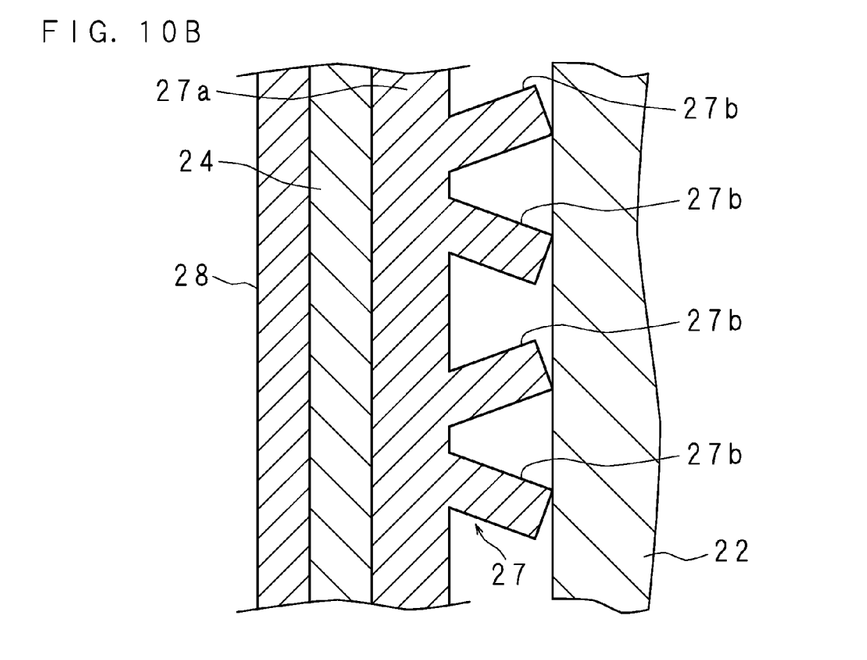

The example of the arrangement of the elastic protrusions 27b on the support board 27a is not limited to the form described earlier. FIGS. 10A and 10B are enlarged section views illustrating examples of other arrangements of the elastic protrusions 27b. As illustrated in FIG. 10A, the support board 27a has elastic protrusions 27b that are inclined forward at the front side from the middle on one end face thereof at the light source 21 side and are arranged in parallel with each other, and elastic protrusions 27b that are inclined backward at the back side from the middle on the one end face at the light source 21 side and are arranged in parallel with each other.

As illustrated in FIG. 10B, the support board 27a is provided with, on one end face thereof, elastic protrusions 27b facing forward or backward that are alternately arranged.

Figure 11A:
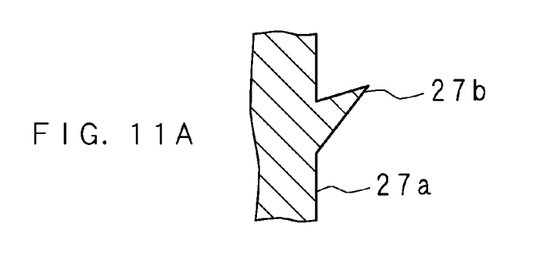
FIGS. 11A to 11E are enlarged sections view illustrating example of other shapes of the elastic contact part.

The shape of the elastic protrusion 27b is not limited to the form described earlier. FIGS. 11A to 11E are enlarged section views illustrating examples of other shapes of the elastic protrusions 27b. As illustrated in FIG. 11A, the elastic protrusion 27b may have a triangular shape in the cross sectional view which is tapered toward the tip end thereof.

Because of its tapered shape, the elastic protrusion 27b is even more easily deflected.

Figure 11B:
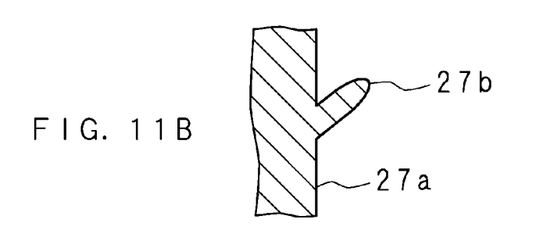

As illustrated in FIG. 11B, the elastic protrusion 27b may have an elliptical shape in the cross sectional view.

Figure 11C:
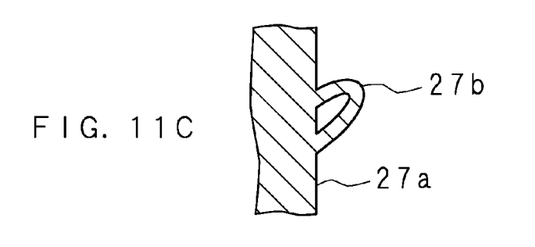

As illustrated in FIG. 11C, the elastic protrusion 27b may have an elliptical shape in the cross sectional view with a hollow inner part.

Because of the hollow inner part, the elastic protrusion 27b is even more easily deflected.

Figure 11D:
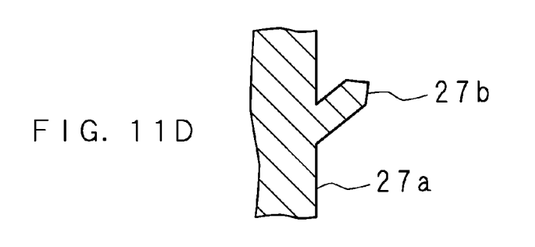

As illustrated in FIG. 11D, the elastic protrusion 27b has a pentagonal shape in the cross sectional view.

Because of its pentagonal cross section, the elastic protrusion 27b may alleviate the damage on the light guide plate 22 caused by a corner.

Figure 11E:
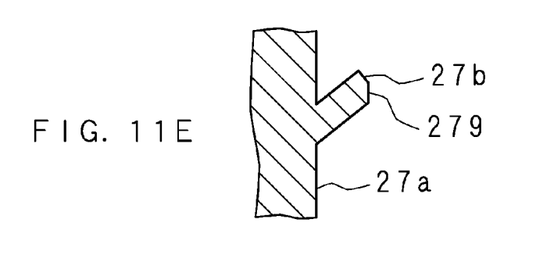

As illustrated in FIG. 11E, the elastic protrusion 27b may have a rectangular shape in the cross sectional view with an inclined surface 279 at the crest.

Because of the inclined surface 279, the elastic protrusion 27b may alleviate the damage on the light guide plate 22 caused by a corner.

It should be understood that the embodiments disclosed herein are illustrative and non-restrictive in every respect. Since the scope of the present invention is defined by the appended claims rather than by the description preceding them, all changes that fall within metes and bounds of the claims, or equivalence of such metes and bounds thereof are therefore intended to be embraced by the claims.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A light source device, comprising:
a light guide plate;
a light source opposed to one end face of the light guide plate;
a casing with one face being open, which houses the light guide plate and the light source; and
a frame member fitted onto an edge of the casing,
wherein
the casing includes a contact part, formed upward at a bottom face of the casing, being in contact with the one end face of the light guide plate,
the frame member includes
a projection part which projects toward the light guide plate and to an inner side from the edge of the casing, and
an elastic contact part which is like a plate, extending from the projection part toward the bottom face of the casing and to be in parallel with other end face which is opposite side of the one end face of the light guide plate, being in contact with the other end face of the light guide plate while being elastic,
wherein the elastic contact part can be deflected in a thickness direction orthogonal to the other end face of the light guide plate, and the elastic contact part includes
a first part having a constant thickness, and
a second part which is a tip end side part than the first part and reducing a thickness of the second part toward the tip end,
the elastic contact part being in contact with the other end face of the light guide plate at the first part.

2. The light source device according to claim 1, wherein the second part is provided with a chamfered part at a crest on a side opposed to the other end face of the light guide plate.

3. A display apparatus, comprising
the light source device according to claim 1, and
a display panel opposed to the light guide plate of the light source device,
wherein a back face of the display panel is irradiated with light emitted from the light guide plate, so that an image is displayed on a front face of the display panel.

4. A light source device, comprising:
a light guide plate;
a light source opposed to one end face of the light guide plate;
a casing with one face being open, which houses the light guide plate and the light source; and
a frame member fitted onto an edge of the casing,
wherein
the casing includes a contact part, formed upward at a bottom face of the casing, being in contact with the one end face of the light guide plate,
the frame member includes
a support board opposed to other end face which is opposite side of the one end face of the light guide plate, and
a plurality of elastic protrusions extending from the support board, the plurality of elastic protrusions are a board with vertical cross section of a polygon including
a first side, and
a second side being in parallel with the first side and shorter than the first side,
the first side board surface is fixed to the support board and the second side board surface is contacting with the other end face of the light guide plate.

5. The light source device according to claim 4, wherein each of the elastic protrusions is inclined with respect to the other end face of the light guide plate.

6. The light source device according to claim 4, wherein each of the elastic protrusions has a hollow part inside of a surrounding part.

7. The light source device according to claim 4, wherein the plurality of elastic protrusions are a board with vertical cross section of a pentagon including the first side, the second side, a third side being connected to the first side and the second side, a fourth side being in parallel with the third side, shorter than the third side and being connected to the first side, and a fifth side being connected to the second side and the fourth side.

8. The light source device according to claim 7, wherein the fourth side being closer to a bottom of the casing than the third side.

* * * * *